United States Patent
El Khayat et al.

(10) Patent No.: US 10,956,217 B2
(45) Date of Patent: Mar. 23, 2021

(54) TECHNIQUE FOR OPTIMIZING THE SCALING OF AN APPLICATION HAVING A SET OF VIRTUAL MACHINES

(71) Applicant: Telefonaktiebolaget LM Ericsson (publ), Stockholm (SE)

(72) Inventors: Ibtissam El Khayat, Glons (BE); Joerg Aelken, Eynatten (BE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 193 days.

(21) Appl. No.: 15/779,162

(22) PCT Filed: Dec. 4, 2015

(86) PCT No.: PCT/EP2015/078654
§ 371 (c)(1),
(2) Date: May 25, 2018

(87) PCT Pub. No.: WO2017/092823
PCT Pub. Date: Jun. 8, 2017

(65) Prior Publication Data
US 2018/0349195 A1    Dec. 6, 2018

(51) Int. Cl.
*G06F 9/50* (2006.01)
*G06F 9/455* (2018.01)

(52) U.S. Cl.
CPC ........... *G06F 9/5027* (2013.01); *G06F 9/505* (2013.01); *G06F 9/5077* (2013.01); *G06F 2009/4557* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 2005/0044228 A1 | 2/2005 | Birkestrand et al. | |
| 2010/0037038 A1* | 2/2010 | Bieswanger | G06F 1/3203 712/220 |
| 2011/0179132 A1 | 7/2011 | Mayo et al. | |

(Continued)

FOREIGN PATENT DOCUMENTS

EP     2381363 A2    10/2011

OTHER PUBLICATIONS

ETSI, "Network Functions Virtualisation (NFV); Management and Orchestration", ETSI GS NFV-MAN 001 V1.1.1, Dec. 2014, 1-184.

(Continued)

*Primary Examiner* — Shih-Wei Kraft
(74) *Attorney, Agent, or Firm* — Patent Portfolio Builders, PLLC (57) ABSTRACT

Methods, apparatus, and articles of manufacture are disclosed to trigger a scaling action for scaling an application having a set of one or more virtual machines (VMs). Virtualized Network Functions (VNF) are scaled by adding or removing resources to/from existing VMs. In an example method for triggering a scaling action for scaling an application having a set of one or more VMs, a threshold value is adapted based on an evaluation of a monitored system key performance indicator and a monitored external key performance indicator. The threshold value is used for triggering the scaling action. The scaling action is validated based on the monitored external key performance indicator.

16 Claims, 7 Drawing Sheets

Monitoring the system key performance indicator and the external key performance indicator — S101

Adapting a threshold value on the basis of an evaluation of a monitored system key performance indicator and a monitored external key performance indicator — S102

(56) References Cited

U.S. PATENT DOCUMENTS

| | | |
|---|---|---|
| 2012/0254443 A1 | 10/2012 | Ueda |
| 2013/0326506 A1 | 12/2013 | Mcgrath et al. |
| 2014/0040885 A1 | 2/2014 | Donahue |
| 2014/0201374 A1 | 7/2014 | Ashwood-smith et al. |
| 2015/0381711 A1* | 12/2015 | Singh ................. H04L 41/0813 709/221 |

OTHER PUBLICATIONS

Office Action issued in corresponding EP Application No. 15805461.9 dated Jan. 4, 2019, 06 Pages. The reference cited therein has been previously made of record.

\* cited by examiner

TECHNIQUE FOR OPTIMIZING THE SCALING OF AN APPLICATION HAVING A SET OF VIRTUAL MACHINES

TECHNICAL FIELD

The present invention relates to an arrangement and method for optimizing the scaling of an application having a set of one or more virtual machines.

BACKGROUND

The workgroup on Network Function Virtualization (NFV) within ETSI have published recommendations on the lifecycle management of Virtualized Network Functions (VNF) in their framework on management and orchestration (MANO). One particular aspect for the lifecycle management of VNFs is their elasticity via scale-out/-in or scale-up/-down.

Scale-out/-in means changing the capacity of a VNF by means of adding or removing virtual machines (VM). Scale-up/-down means changing the capacity of a VNF by adding or removing resources to/from the existing virtual machines (VM). The scaling execution is caused by a system entity detecting the need for a capacity increase/decrease via monitoring key performance indicators (KPIs) of the VNF or its underlying infrastructure. The behavior of the detection entity is usually configured by means of policies.

The policy configuration concerning scale-out/-in and scale-up/-down, including KPIs and thresholds, are provided via descriptors for the VNF. The descriptors are interpreted during deployment and runtime of a VNF.

VNF scaling and auto-scaling, which takes automated decisions on triggering a scaling request, relies upon KPIs crossing a certain threshold. The key performance indicator values used for threshold validation could be reflecting instant behavior, i.e. run-time measurement values or trends observed over a long period, i.e. aggregated values from post-processing of measurements.

The threshold values are usually configured based on best knowledge by the owner of the VNF in the corresponding descriptor of the VNF. The threshold values are configured and are static throughout the life-time of the VNF. Any change requires an Operation and Maintenance (O&M) action. They are not adapted to changed conditions of the network or its infrastructure.

In some scenarios, even with no changes of the load/surrounding conditions, the key performance indicator values might cross the defined threshold values temporarily while the overall long-term behavior is within the set boundaries. Worst case is when the static nature of the threshold values lead to system oscillations. When scaling automatically, the threshold is crossed in one direction triggering a scaling execution and just afterwards the other threshold is crossed leading to an opposite scaling decision.

Such scenarios would become much more common with network function virtualization in which not all hardware is certified and the key performance indicators range might change from one infrastructure to another. In order to avoid this type of situation and potential unnecessary scaling executions, conservative threshold values can be used, i.e. very low thresholds, leading to a loss of efficiency.

SUMMARY

It is an object of the present invention to avoid unnecessary auto-scaling operations for virtual machines.

This object is solved by subject-matter according to the independent claims. Preferred embodiments are subject of the dependent claims, the description and the figures.

According to a first aspect this object is solved by an arrangement for causing a scaling of an application having a set of one or more virtual machines, configured to adapt a threshold value for scaling the application having a set of one or more virtual machines on the basis of an evaluation of a monitored system key performance indicator and a monitored external key performance indicator. By considering the system key performance indicator as well as the external key performance indicator in adapting threshold values, unnecessary auto-scaling actions and scaling oscillations can be mitigated.

An apparatus for an arrangement comprising a processor and a memory is provided, said memory containing instructions executable by said processor whereby said apparatus is operative to adapt a threshold value for scaling the application having a set of one or more virtual machines on the basis of an evaluation of a monitored system key performance indicator and a monitored external key performance indicator.

In a preferred embodiment of the arrangement the system key performance indicator is independent from external conditions of the application.

In a further preferred embodiment of the arrangement the external key performance indicator is dependent on external conditions of the application.

In a further preferred embodiment of the arrangement scaling the application having a set of one or more virtual machines comprises adapting the number of virtual machines or adapting the resources allocated to at least one virtual machine. This embodiment has the technical advantage that scaling is performed efficiently.

In a further preferred embodiment of the arrangement the arrangement is configured to increase an upper threshold value when the system key performance indicator rises above the upper threshold value and falls below a lower threshold value within a predetermined time. This embodiment has the technical advantage that opposite scaling actions can be prevented.

In a further preferred embodiment of the arrangement the arrangement is configured to increase the upper threshold value when the external key performance indicator remains within a predefined band within a predetermined time, e.g. after a scale out/up action. The band is defined by an upper bound and a lower bound in terms of the acceptable tolerance of the external key performance indicator. The acceptable tolerance includes the case of an acceptable difference when comparing two external key performance indicator measurement values. This embodiment has the technical advantage that threshold values are merely changed when external conditions remain unchanged.

In a further preferred embodiment of the arrangement the arrangement is configured to decrease a lower threshold value when the system key performance indicator falls below the lower threshold value and rises above an upper threshold value within a predetermined time. This embodiment also has the technical advantage that opposite scaling actions can be prevented.

In a further preferred embodiment of the arrangement the arrangement is configured to decrease the lower threshold value when the external key performance indicator remains within a predefined band within a predetermined time, e.g. after a scale in/down action. The band is defined by an upper bound and a lower bound in terms of the acceptable tolerance of the external key performance indicator. The acceptable tolerance includes the case of an acceptable difference when comparing two external key performance indicator measurement values. This embodiment also has the technical advantage that threshold values are merely changed when external conditions remain unchanged.

In a further preferred embodiment of the arrangement the arrangement is configured to increase the upper threshold value or to decrease the lower threshold value by a predefined value. This embodiment has the technical advantage that the scaling actions can be prevented with few adaptation steps.

In a further preferred embodiment of the arrangement the arrangement triggers a scaling action based on a previously ignored threshold value. This embodiment has the technical advantage that threshold values do not converge to a too conservative value.

According to a second aspect this object is solved by a method for causing a scaling of an application having a set of one or more virtual machines, comprising the step of adapting a threshold value for scaling the application having a set of one or more virtual machines on the basis of an evaluation of a monitored system key performance indicator and a monitored external key performance indicator. By considering the system key performance indicator as well as the external key performance indicator in adapting threshold values, unnecessary auto-scaling actions and scaling oscillations can be mitigated.

In a preferred embodiment of the method an upper threshold value is increased when the system key performance indicator rises above the upper threshold value and falls below a lower threshold value within a predetermined time. This embodiment also has the technical advantage that opposite scaling actions can be prevented.

In a preferred embodiment of the method the upper threshold value is increased when the external key performance indicator remains within a predefined band within a predetermined time, e.g. after a scale out/up action. The band is defined by an upper bound and a lower bound in terms of the acceptable tolerance of the external key performance indicator. The acceptable tolerance includes the case of an acceptable difference when comparing two external key performance indicator measurement values. This embodiment also has the technical advantage that threshold values are merely changed when external conditions remain unchanged.

In a preferred embodiment of the method a lower threshold value is decreased when the system key performance indicator falls below the lower threshold value and rises above an upper threshold value within a predetermined time, e.g. after a scale in/down action. This embodiment also has the technical advantage that opposite scaling actions can be prevented.

In a preferred embodiment of the method the lower threshold value is decreased when the external key performance indicator remains within a predefined band within a predetermined time. The band is defined by an upper bound and a lower bound in terms of the acceptable tolerance of the external key performance indicator. The acceptable tolerance includes the case of an acceptable difference when comparing two external key performance indicator measurement values. This embodiment also has the technical advantage that threshold values are merely changed when external conditions remain unchanged.

According to a third aspect this object is solved by a computer program product loadable into a memory of a digital computer, comprising software code portions for performing the steps according to the method according to the second aspect when said product is run on the digital computer.

BRIEF DESCRIPTION OF THE DRAWINGS

Further embodiments may be described with respect to the following Figures, in which.

DETAILED DESCRIPTION OF EMBODIMENTS

Figure 1:
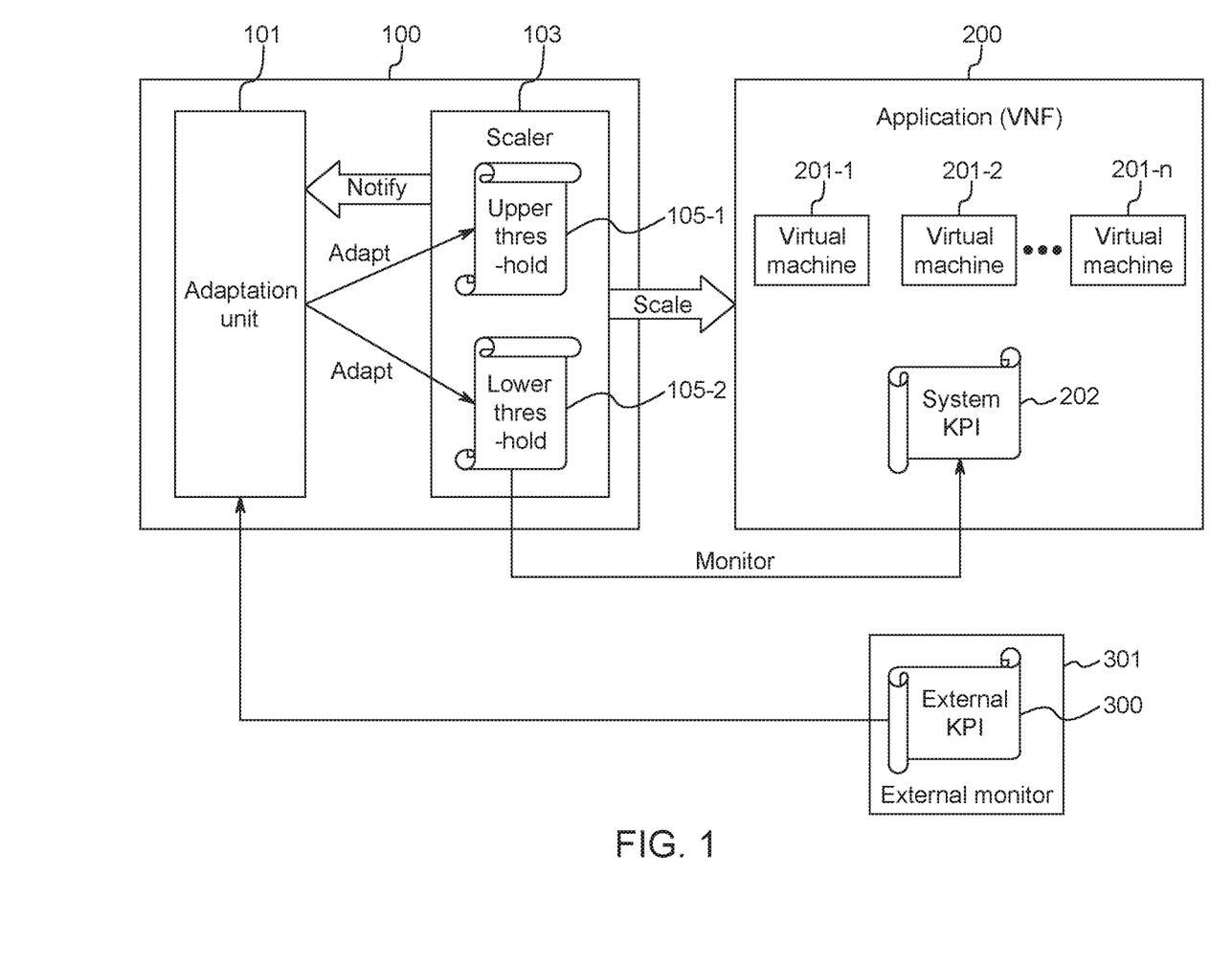
FIG. 1 shows an arrangement and an application.

FIG. 1 shows an arrangement 100 for causing a scaling of an application 200 having a set of one or more virtual machines 201-1 ... 201-n. The arrangement 100 comprises an adaptation unit 101 and a scaler 103.

The adaptation unit 101 monitors external key performance indicators (KPI) 300 and adapts the upper and lower threshold values 105-1 and 105-2 for the system key performance indicators of the scaler 103.

Further, the arrangement 100 comprises a scaler 103 for scaling the application 200 of the virtual machines 201-1, ..., 201-n on the basis of an evaluation of the monitored system key performance indicator 202. If the monitored system key performance indicator 202 exceed an upper threshold value 105-1 or fall below a lower threshold value 105-2, a scaling action of the application 200 of the virtual machines 201-1, ..., 201-n may be caused by the scaler 103. The scaler 103 notifies the adaptation unit 101 in case a scaling action has been caused.

An application 200 that provides virtualized network functions (VNF) comprises a number of virtual machines 201-1 ... 201-n, i.e. one or several virtual machines. Each of the virtual machines 201-1, ..., 201-n is an emulation of a particular computer system. The application may belong to a telecommunications cloud system. The telecommunications cloud system may further comprise at least one of a Radio Base Station (RBS) function, an Evolved Packet Core (EPC) function, an IMS core function, and one or more other functions running on the set of virtual machines.

A Virtual Machine (VM) may generally be constituted by a (virtualized) computing resource. Thus, creation or generation of a VM may refer to deployment or allocation of the associated computing resource. To each computing resource, networking resources and storage resources can be added (e.g., associated, allocated or connected) on demand. Different technologies exist to allocate computing resources and exposed them as VMs. Such technologies include a hypervisor as hardware abstraction layer, containers (e.g., Linux containers), PaaS frameworks, and a so-called bare metal virtualization. In the ETSI Framework, the term is used to designate a virtualized application. A deployed VNF typically consists of multiple instances of one or more (typically different) VM types, where each VM type runs its own, dedicated function.

The application may be configured as a VNF. Moreover, the arrangement may be configured as a VNF Manager (VNFM). The VNF and VNFM may conform to ETSI GS NFV-MAN 001, V1.1.1 (2014-12). It should be noted that the arrangement could also be configured in any other manner and is thus not limited to being implemented in a telecommunications scenario. Each component of the arrangement may be implemented in one unit or in separate units communicating via a defined interface.

In a horizontal scaling action the number of virtual machines 201-1, . . . , 201-n of the application 200 is changed. In a vertical scaling action resources assigned to each of the virtual machines 201-1, . . . , 201-n of the application 200 are changed, like the amount of usable storage. Both scaling actions can be caused on the basis of crossing the upper and lower threshold values 105-1 and 105-2.

A system key performance indicator 202 is a performance indicator that is influenced by the behavior and configuration of the system being monitored, like the application 200 comprising virtual network functions. System key performance indicators 202 comprise for example a request answer time or a processing time and depend on the way how the system behaves, works, or is being configured. Reducing or extending the resources allocated to the system might influence these system key performance indicators 202 dependent on the load of the system. In other terms, the system to be monitored itself has an impact on this system key performance indicator 202. The system key performance indicator 202 is inherent to the system.

An external key performance indicator 300 is a performance indicator that is not influenced by the behavior and configuration of the system being monitored. The system itself has no impact on the external key performance indicator 300. External key performance indicators 300 comprise for instance the number of incoming requests or ingress traffic throughput. External key performance indicators 300 are influenced by the surrounding, like upstream nodes. The system to be monitored has no control of the external key performance indicators 300. The external key performance indicators 300 reflect for example changes that happen upstream in the network. External key performance indicators 300 are capable of capturing traffic load and traffic load variation. In other terms, the system to be monitored has no impact on these external key performance indicators 300. The external key performance indicators 300 are not inherent to the system and are merely influenced by external conditions.

In general the arrangement 100, the adaptation unit 101, the scaler 103, the application 200 or the virtual machines 201-1, . . . , 201-n can be arranged in various ways as long as their aforementioned interaction is maintained. The arrangement 100, the adaptation unit 101, the scaler 103 and the application 200 can be built by digital electronic circuits or software programs. In general one or more system key performance indicators 202 or external key performance indicators 300 can be used as a basis for adapting the threshold values 105-1 and 105-2.

However, scaling-in/-down actions followed by subsequent scaling-out/-up actions without substantial changes of the external key performance indicator 300 or vice versa should be prevented since scaled resources and processing time are wasted unnecessarily.

Figure 2:
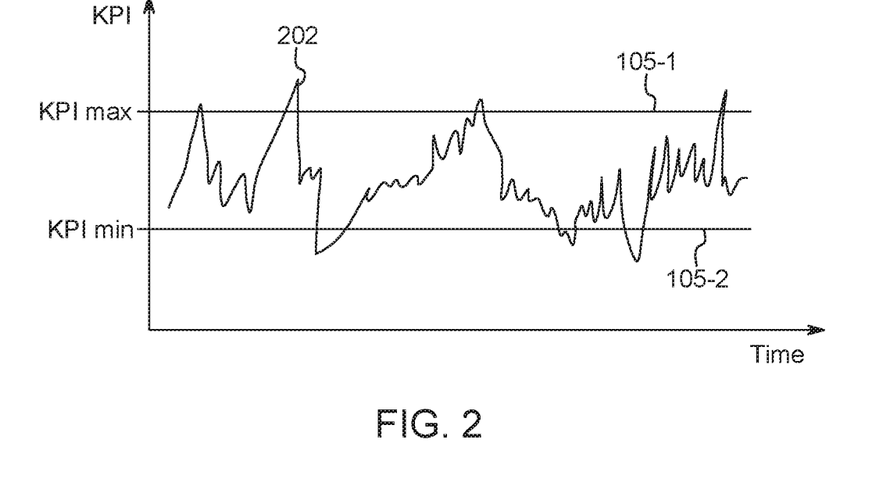
FIG. 2 shows a diagram of a system key performance indicator in dependence on time.

FIG. 2 shows a diagram of a system key performance indicator 202 in dependence on time. The diagram shows an upper threshold value 105-1 for the system key performance indicator 202 and a lower threshold value 105-2 for the system key performance indicator 202. If the system key performance indicator 202 exceeds the upper threshold value 105-1 or falls below the lower threshold value 105-2 a scaling action can be caused.

Figure 3:
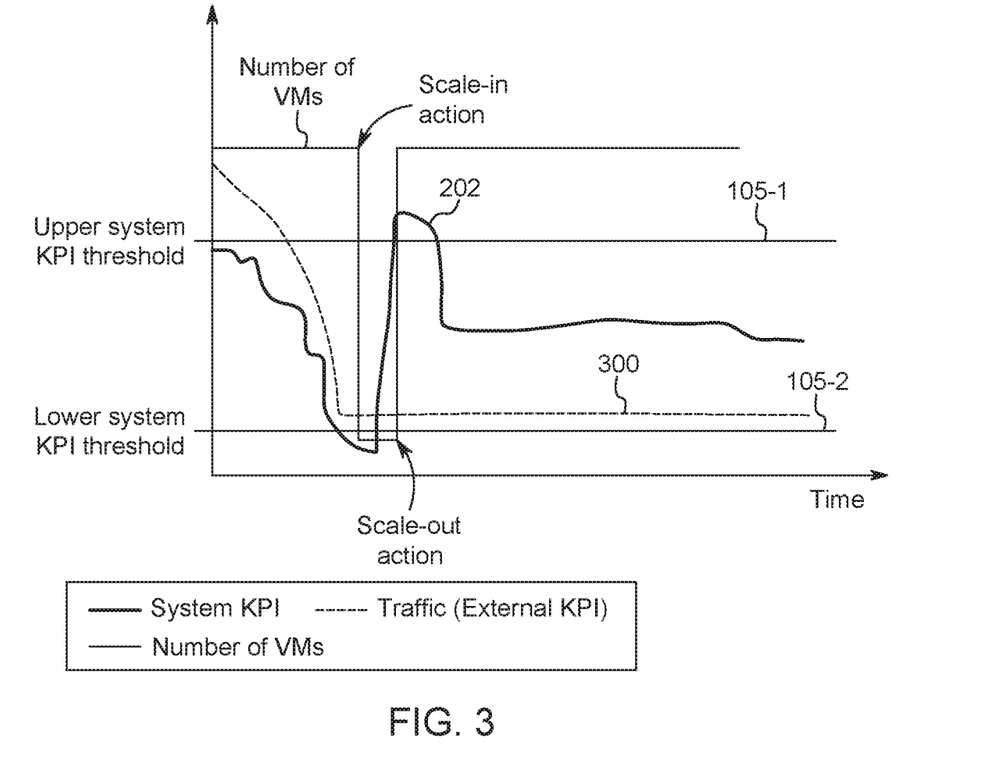
FIG. 3 shows a diagram comprising system and external key performance indicators in dependence on time.

FIG. 3 shows a diagram comprising a system key performance indicator 202 and an external key performance indicator 300 in dependence on time. If the system key performance indicator 202 falls below the lower threshold value 105-2, a scaling-in action is caused that for example reduces the number of virtual machines. Subsequently, the system key performance indicator 202 rises above the upper threshold value 105-1 and causes a scaling-out action that again increases the number of virtual machines.

However, during these scaling actions the external key performance indicator 300 remains essentially constant. Therefore, the scaling-in action and the subsequent opposite scaling-out action are not necessary and waste resources. In order to avoid these unnecessary scaling actions the lower threshold value 105-2 is adapted by the adaptation unit 101 by lowering it. In this case the lowered threshold value 105-2 will not be hit in a corresponding future situation so that unnecessary scaling actions are avoided.

Figure 4:
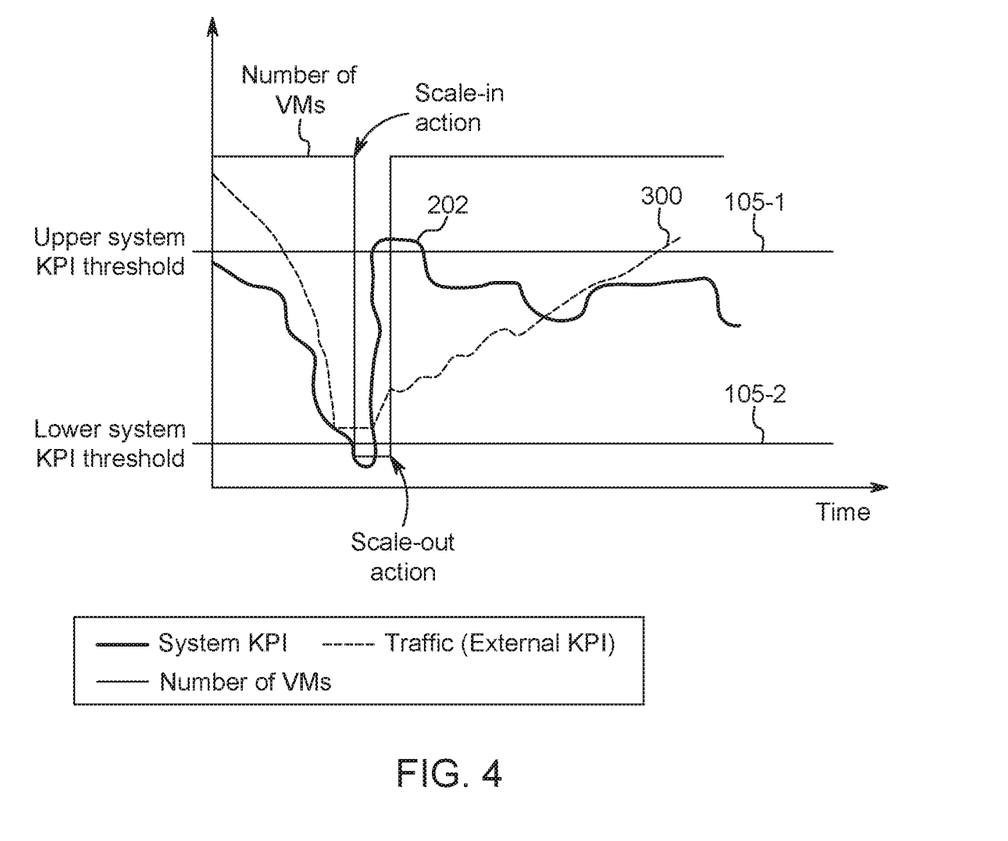
FIG. 4 shows a further diagram comprising system and external key performance indicators in dependence on time.

FIG. 4 shows a further diagram comprising a system key performance indicator 202 and an external key performance indicator 300 in dependence on time. If the system key performance indicator 202 falls below the lower threshold value 105-2, a scaling-in action is caused. Subsequently, the system key performance indicator 202 rises above the upper threshold value 105-1 and causes a scaling-out action.

However, during these actions the external key performance indicator 300 rises continuously. In this case both scaling actions are justified, since the external key performance indicator 300 has changed, i.e. the surrounding conditions of the application 200. In response the lower threshold value 105-2 remains unchanged by the adaptation unit 101.

Figure 5:
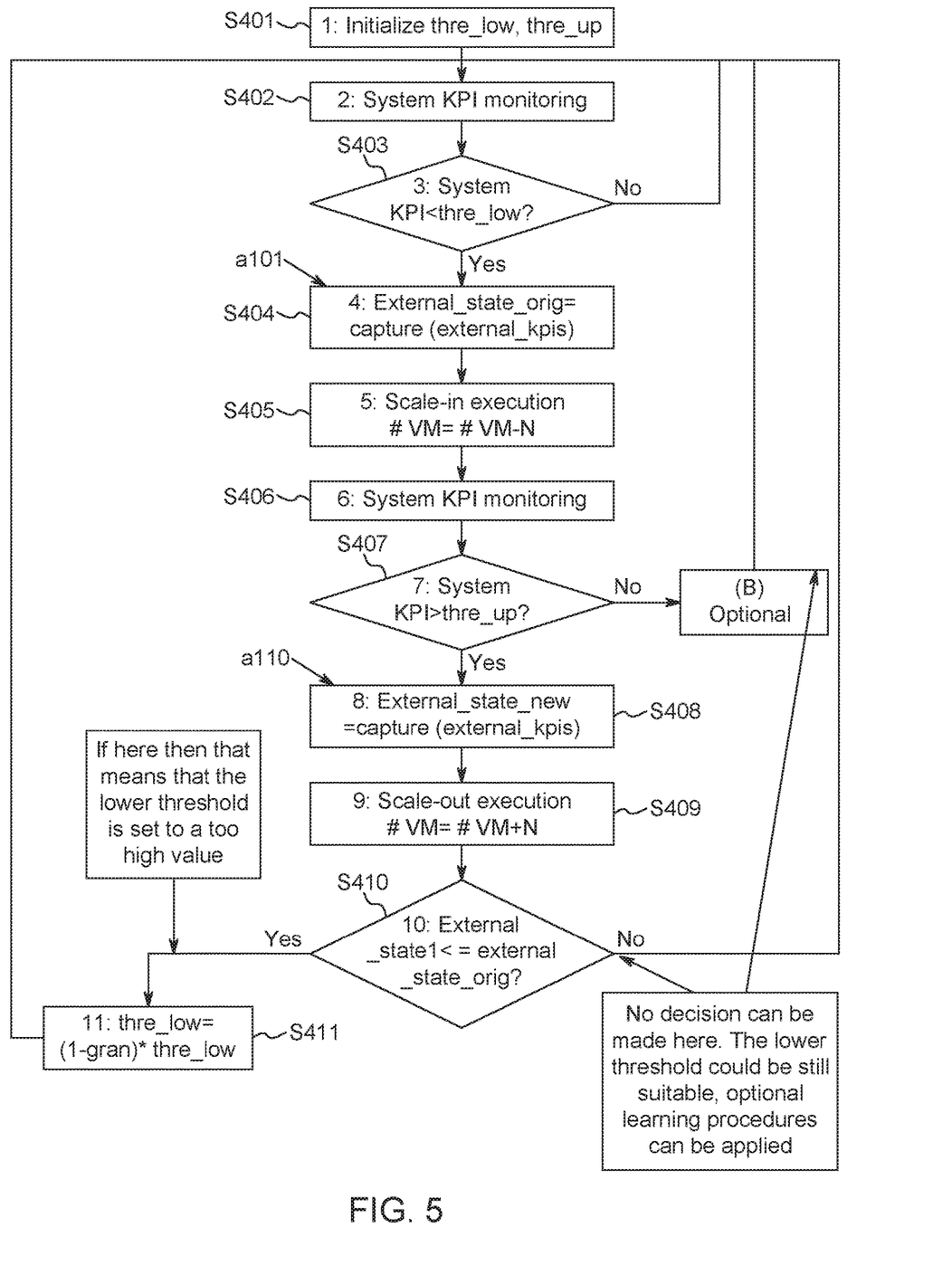
FIG. 5 shows a flow diagram of an algorithm for adapting threshold values.

FIG. 5 shows a flow diagram of an algorithm. The details of the algorithm are explained under the assumption that the decision for a scaling action is based on a unique and single system key performance indicator 202. Further the number of VMs/jobs or amount of resources allocated to the VMs/jobs that need to be added or removed is fixed per scaling action. The flow diagram illustrates the algorithm for the case of an originating scale-in action. A respective flow diagram for a scale-out action can be created by reverting the corresponding "low" into "up", "up" into "low", "<" into ">" etc. Respective flow diagrams for scale-up/down actions can be further created by changing the execution action into adding/removing allocated resources.

In step S401 the upper and lower threshold values 105-1 and 105-2 for the system key performance indicator 202 are initialized. In step S402 the system key performance indicator 202 is continuously monitored. In step S403 the system key performance indicator 202 is compared to the lower threshold value 105-2 and is detected to be below the lower threshold value 105-2 or not. In case the lower threshold value 105-2 is not crossed, the monitoring of the system key performance indicator 202 is continued with step S402.

In step S404 in case the lower threshold value 105-2 is crossed, i.e. the system key performance indicator 202 is below the lower threshold value 105-2, the external key performance indicators 300 are collected and stored as an original external state (a101). The external key performance indicators 300 can be collected beforehand and should be just used. This is to capture the system environment before performing any scaling decision.

In step S405 a scale-in action is executed that reduces the capacity of the application 200 by the configured number N of virtual machines. Afterwards the new number of VM is X. In step S406 the system key performance indicator 202 is continued to be monitored as during a normal operation (similar to step S402).

In step S407 the system key performance indicator 202 is compared to the upper threshold value 105-1 for the system key performance indicator 202 and is detected to be above the upper threshold value 105-1 or not. In case the upper threshold value 105-1 has not been crossed within a predetermined amount of time, no further conclusion on the applicability of the lower threshold value 105-2 can be drawn. The optional procedure to apply some further learning can be applied. Otherwise monitoring the system key performance indicator 202 is continued in step S402.

In step S408 in case the upper threshold value 105-1 is crossed, i.e. the system key performance indicator 202 is above the upper threshold 105-1, the external key performance indicator 300 is collected and stored as a new external state (a110). In step S409 the scale-out action is executed that increases the capacity of the application 200 by the configured number N of virtual machines. The need of this scale out action means that the number of X VMs (step S405) is not sufficient to handle the current traffic.

In step S410 the newly captured external state is compared with the captured original external state. If the newly captured external key performance indicators 300 show similar or better external conditions, the number of X VMs is not sufficient for the current traffic, i.e. are not sufficient to handle the traffic before the scale-in decision.

This is an indicator that the original scale-in decision was not suitable and the lower threshold value 105-2 is too high and should be adapted. If the newly captured external key performance indicator 300 shows worse conditions than before the scale-in decision, no conclusion on the applicability of the lower threshold value 105-2 can be drawn and it is continued with monitoring the system key performance indicator 202 in step S402.

In Step S411 the lower threshold value 105-2 is decreased. In this example a pre-configured granularity or step size is used which specifies the relative value by which the lower threshold value 105-2 is to be reduced. Other procedures on how to calculate adapted threshold values 105-1 and 105-2 can be applied here as well.

Figure 6:
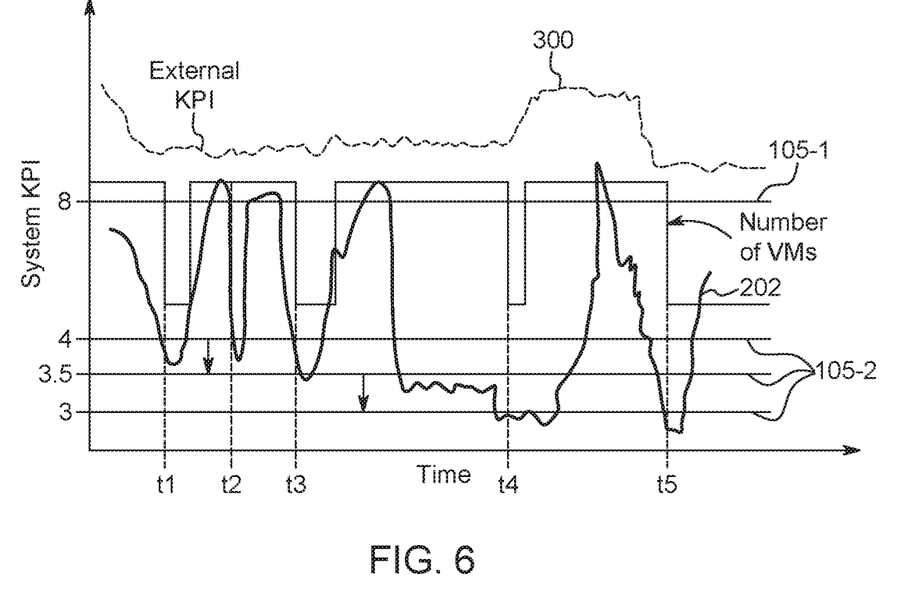
FIG. 6 shows an example for adapting the threshold value.

FIG. 6 shows an example for adapting the threshold value 105-2 on the basis of a course of the system key performance indicator 202 and the external key performance indicator 300.

The initial lower threshold value 105-2 for the system key performance indicator 202 is set to 4 and the upper threshold value 105-1 for the system key performance indicator 202 is set to 8. The granularity or step size of the threshold adaptation for the system key performance indicator is chosen to be 0.5.

At time t1 the system key performance indicator 202 crosses the lower threshold value 105-2, set to 4. Subsequently, the system key performance indicator 202 crosses the upper threshold value 105-1, set to 8. In this case a scale-in action is followed by scale-out action (steps S403 to step S407). The external key performance indicator 300 before and after the scale-in action remains essentially the same. This is an indication that the scale-in decision was not required (steps S410 and S411). Consequently the lower threshold value 105-2 is reduced by the configured granularity and set to 3.5=4−0.5

At time t2 the system key performance indicator 202 passes the original lower threshold value 105-2 of 4. This time this has no impact, since the new threshold value 105-2 that is set to 3.5 is not passed. No scaling-in action is performed.

At time t3 a similar procedure occurs as described with respect to time t1. The lower threshold value 105-2 is once again adapted to a value of 3=3.5−0.5.

At time t4 the system key performance indicator 202 crosses the lower threshold value 105-2, previously set to 3. Once again scale-in and scale-out actions follow each other. However, in contrary to the situations described for times t1 and t3, the external key performance indicator 300 before the scale-in decision was more favorable than after this decision (steps S410). This indicates that in addition the network traffic has increased and both scaling decisions are correct. In this case a conclusion on the correctness of the threshold values 105-1 and 105-2 cannot be drawn so that no threshold adaptation is performed.

At time t5 the lower threshold value 105-2, still set to 3, is crossed and the system has reached a stable capacity state.

After execution of the threshold adaption procedure of this example, the lower threshold value 105-2 has converged to the found optimal value of 3. An improvement is reached when the algorithm triggers a scaling action based on a previously ignored threshold setting in order to ensure that the threshold values 105-1 and 105-2 do not converge to a too conservative value.

Figure 7:
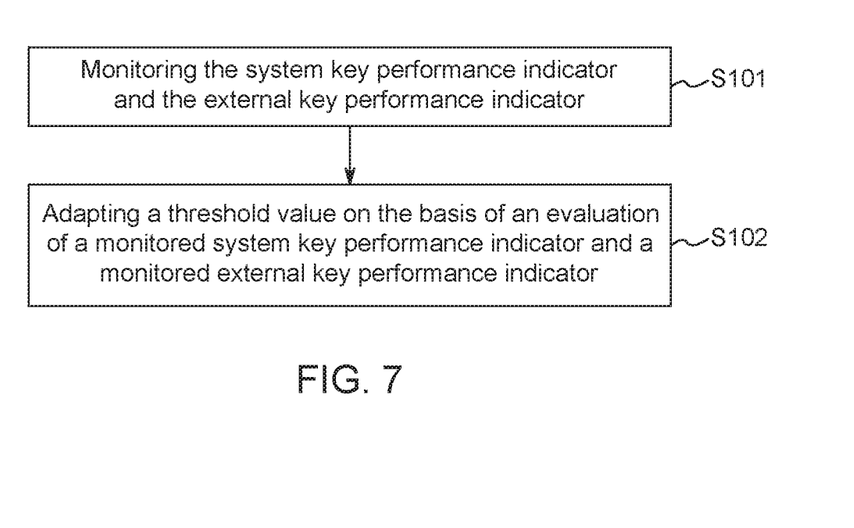
FIG. 7 shows a block diagram of a method for optimizing the scaling of an application.

FIG. 7 shows a block diagram of a method for optimizing the scaling of an application having one or more virtual machines 201-1 . . . 201-n. First, the threshold values 105-1 and 105-2 for the system key performance indicator 202 are initialized according to the VNF user settings, like minimum/maximum/optimum desired range, in the VNF descriptor.

The method comprises the step S101 of monitoring the system key performance indicator 202 and the external key performance indicator 300. Then, the method comprises the step S102 of adapting the threshold value 105-1, 105-2 for scaling the application having one or more virtual machines on the basis of an evaluation of a monitored system key performance indicator 202 and a monitored external key performance indicator 300.

When an auto-scaling action is executed that is caused by a crossing of the threshold values 105-1 or 105-2 for system key performance indicator 202, the system checks after the execution of the scaling action whether an opposite scaling action has been performed due to crossing the opposite threshold 105-1 or 105-2. If an opposite scaling action has been taken while the external key performance indicator 300 did not change, then the original scaling action is considered as unnecessary, and the threshold value 105-1 and 105-2 of the system key performance indicator 202 is adapted.

If the original scaling action is caused because a system key performance indicator 202 exceeded the upper threshold value 105-1, then that upper threshold value 105-1 is considered as being too low and is increased. If to the contrary the original scaling action is caused because the system key performance indicator 202 fell below the lower threshold value 105-2, then the lower threshold value 105-2 is considered as being too high and is decreased.

In this scenario the network traffic that is considered as an external key performance indicator 300, is stable after the scale-in action. If the thresholds values 105-1 and 105-2 are set right, the number of VMs should not change during a stable traffic period. Adapting the threshold values 105-1 and 105-2 avoid unnecessary scaling of the number of virtual machines. However, this has to be discriminated from the case in which a scale-out decision is met due to a higher traffic occurring after the scale-in decision. In case no conclusions for setting the threshold values 105-1 and 105-2 can be drawn and the threshold values 105-1 and 105-2 remain unchanged.

Figure 8:
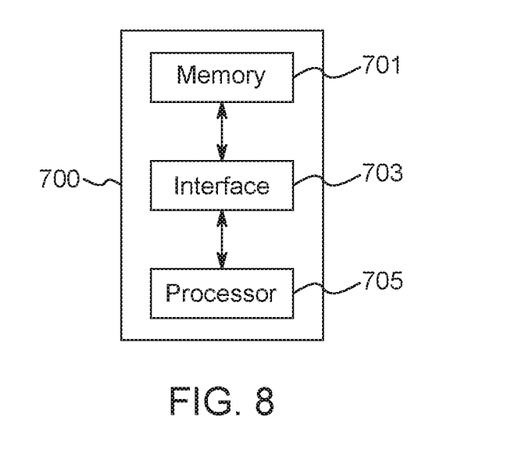
FIG. 8 shows a digital computer.

FIG. 8 shows a digital computer 700 comprising an arrangement 100. The computer 700 can comprise a computer program product that is directly loadable into the internal memory 701 of the digital computer 700, comprising software code portions for performing any of the aforementioned method steps when said product is run on the computer 700.

The computer 700 can be a general-purpose device that can be programmed to carry out a set of arithmetic or logical operations automatically on the basis of software code portions. The computer 700 comprises the internal memory 701, such like a random access memory chip that is coupled by an interface 703, like an IO bus, with a processor 705. The processor 705 is the electronic circuitry within the computer 700 that carries out the instructions of the software code portions by performing the basic arithmetic, logical, control and input/output (I/O) operations specified by the instructions. To this end the processor 705 accesses the software code portions that are stored in the internal memory 701.

Figure 9:
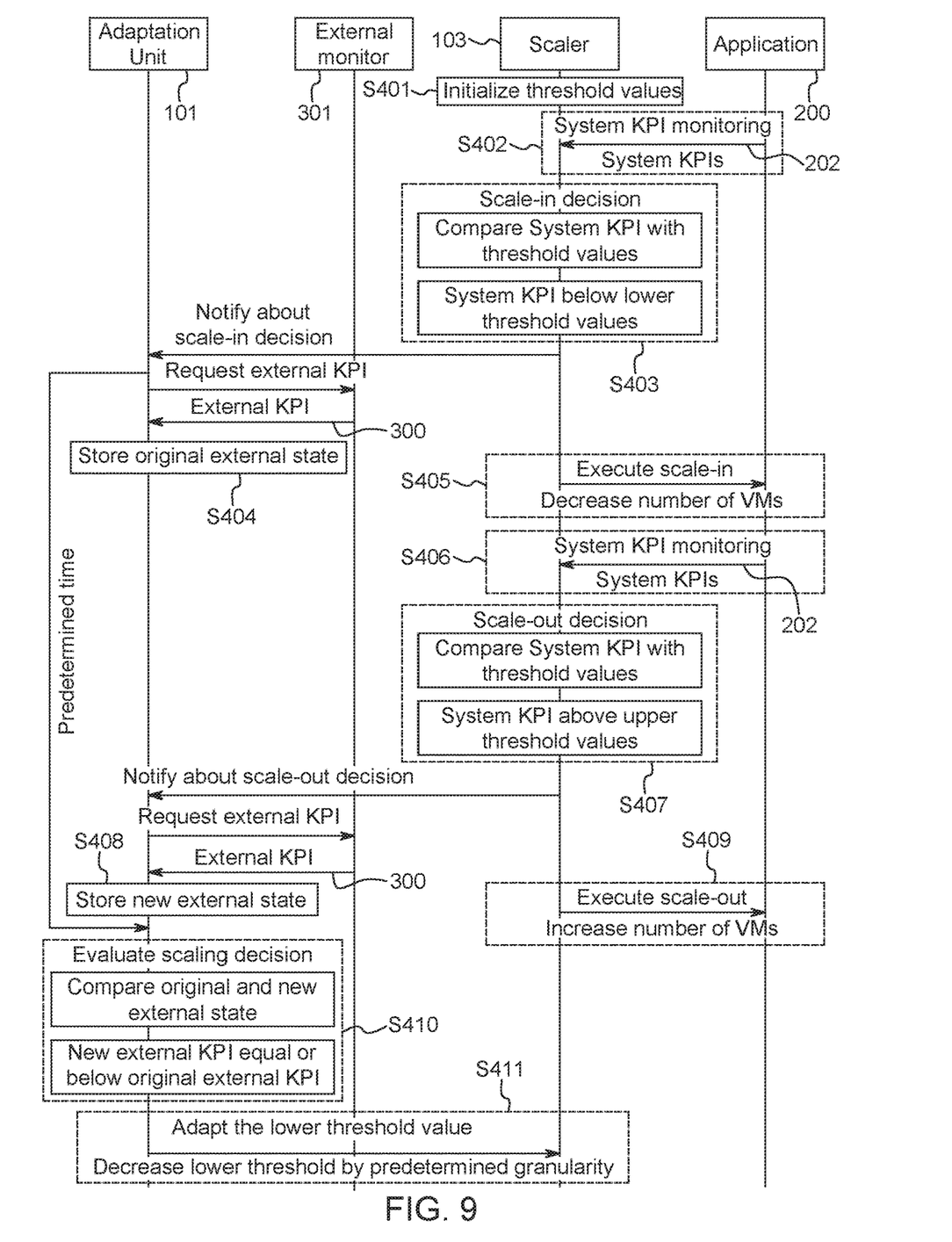
FIG. 9 shows a sequence chart of the comprising the actions of and messages in between the arrangement and the application.

FIG. 9 shows a sequence chart of the comprising the actions of and messages in between the arrangement 100 and the application 200 as explained with respect to FIG. 5.

In step S401 the scaler 103 initializes the threshold values 105-1 and 105-2 by assigning particular values. In step S402 the application 200 sends the system key performance indicator 202 to the scaler. The application 200 detects the system key performance indicator 202 by continuously monitoring.

In step S403 a scale-in decision is met. To this end the system key performance indicator 202 is compared with the threshold values 105-1 and 105-2. If the system key performance indicator 202 is below the lower threshold value 105-2, the adaptation unit 101 is notified about a scale-in decision from the scaler 103. The adaptation unit 101 requests the external key performance indicator 300 from an external monitor 301. The external monitor 301 sends the external key performance indicator 300 to the adaptation unit 101.

In step S404 the original external state, i.e. the external key performance indicator 300, is stored so that it can be retrieved later. In step S405 scaling-in is executed by sending a notification to the application 200 from the scaler 103 to decrease the number of virtual machines. In step S406 the application 200 sends a further system key performance indicator 202 to the scaler obtained by monitoring the system.

In step S407 a scale-out decision is met. To this end the system key performance indicators 202 are again compared with the threshold values 105-1 and 105-2. If the system key performance indicator 202 is above the upper threshold value 105-1, the adaptation unit 101 is notified about a scale-out decision from the scaler 103. The adaptation unit 101 requests the external key performance indicator 300 from the external monitor 301. The external monitor 301 sends the external key performance indicator 300 to the adaptation unit 101. Scaling-out occurs within a predetermined time from the scaling-in.

In step S408 the new external state, i.e. the external key performance indicator 300, is stored so that it can be retrieved. In step S409 scaling-out is executed by sending a notification to the application 200 from the scaler 103 to increase the number of virtual machines.

In step S410 the former scaling decision is evaluated. To this end the original external state from step S404 and the new external state from step S408 are compared. It is tested if the new external key performance indicator 300 is equal or below the original external key performance indicator 300.

In step S411 the lower threshold value 105-2 is adapted. To this end the adaptation unit 101 notifies the scaler 103 to decrease the lower threshold value 105-2 by a predetermined granularity.

In general it is differentiated between two types of key performance indicators, i.e. system key performance indicators and external key performance indicators. The system key performance indicators 202 are used for comparison against threshold values 105-1 and 105-2 for scaling decisions, whereas the external key performance indicators 300 are used for validation of the scaling decision. Dynamically adapting the threshold values 105-1 and 105-2 for the system key performance indicator 202 during VNF run-time avoids auto-scaling oscillations.

The method and the network entity 100 dynamically adapt the threshold values 105-1 and 105-2 used for causing scaling executions during VNF run-time. The threshold values 105-1 and 105-2 converge to optimal values and unnecessary auto-scaling operations are avoided.

An avoiding of auto-scaling oscillations improves the VNF operations. The VNF owner does not have to spend efforts on monitoring the scaling behavior and manually adapting the system key performance indicator thresholds. After system convergence, i.e. after the system key performance indicator thresholds are adapted to stable values, no VNF service degradation occurs due to non-suitable scale-in/-down decisions that lead to starvation of available VNF resources An avoiding of auto-scaling oscillations leads to a better VNF resource efficiency. The VNF resources are not used for executing unnecessary auto-scaling operations. In addition there is no need for specifying conservative key performance indicator thresholds values that lead to unused resources and loss of efficiency.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. An apparatus configured for triggering a scaling action for scaling of an application having a set of one or more virtual machines, the apparatus comprising:
   a processor; and
   a memory containing instructions executable by the processor that, upon execution by the processor, causes the apparatus to:
   monitor a system key performance indicator and an external key performance indicator during application runtime;

adapt a lower threshold value and an upper threshold value based on an evaluation of the monitored system key performance indicator and the monitored external key performance indicator;

trigger the scaling action for scaling the application having the set of one or more virtual machines based on the monitored system key performance indicator crossing one of the lower threshold value and the upper threshold value;

validate, in response to an opposite scaling action being triggered based on the monitored system key performance indicator crossing an opposite threshold value of the one of the lower threshold value and the upper threshold value, the scaling action based on the monitored external key performance indicator remaining within a predefined band; and dynamically adjust, in response to the validation, the one of the lower threshold value and the upper threshold value by a predefined value during the application runtime.

2. The apparatus according to claim 1, wherein the monitored system key performance indicator is independent from external conditions of the application.

3. The apparatus according to claim 1, wherein the monitored external key performance indicator is dependent on external conditions of the application.

4. The apparatus according to claim 1, wherein scaling the application having the set of one or more virtual machines comprises adapting the number of the one or more virtual machines or adapting resources allocated to at least one virtual machine of the one or more virtual machines.

5. The apparatus according to claim 1, wherein the instructions executable by the processor that, upon execution by the processor, further causes the apparatus to increase the upper threshold value based on the monitored system key performance indicator rising above the upper threshold value and falling below the lower threshold value within a first predetermined time.

6. The apparatus according to claim 5, wherein the instructions executable by the processor that, upon execution by the processor, further causes the apparatus to increase the upper threshold value based on the monitored external key performance indicator remaining within the predefined band within a second predetermined time.

7. The apparatus according to claim 5, wherein the instructions executable by the processor that, upon execution by the processor, further causes the apparatus to increase the upper threshold value or to decrease the lower threshold value by the predefined value.

8. The apparatus according to claim 1, wherein the instructions executable by the processor that, upon execution by the processor, further causes the apparatus to decrease the lower threshold value based on the monitored system key performance indicator falling below the lower threshold value and rising above the upper threshold value within a first predetermined time.

9. The apparatus according to claim 8, wherein the instructions executable by the processor that, upon execution by the processor, further causes the apparatus to decrease the lower threshold value based on the monitored external key performance indicator remaining within the predefined band within a second predetermined time.

10. The apparatus according to claim 1, wherein the instructions executable by the processor that, upon execution by the processor, further causes the apparatus to trigger the scaling action based on a previously ignored threshold value.

11. A method for triggering a scaling action executed by an apparatus for scaling of an application having a set of one or more virtual machines, the apparatus comprising a processor and a memory containing instructions executable by the processor that, upon execution by the processor, executes the method comprising:

monitoring a system key performance indicator and an external key performance indicator during application runtime;

adapting a lower threshold value and an upper threshold value based on an evaluation of the monitored system key performance indicator and the monitored external key performance indicator;

triggering the scaling action for scaling the application having the set of one or more virtual machines based on the monitored system key performance indicator crossing one of the lower threshold value and the upper threshold value;

validating, in response to an opposite scaling action being triggered based on the monitored system key performance indicator crossing an opposite threshold value of the one of the lower threshold value and the upper threshold value, the scaling action based on the monitored external key performance indicator remaining within a predefined band; and dynamically adjusting, in response to the validating, the one of the lower threshold value and the upper threshold value by a predefined value during the application runtime.

12. The method according to claim 11, wherein the upper threshold value is increased based on the monitored system key performance indicator rising above the upper threshold value and falling below the lower threshold value within a first predetermined time.

13. The method according to claim 12, wherein the upper threshold value is increased based on the monitored external key performance indicator remaining within the predefined band within a second predetermined time.

14. The method according to claim 11, wherein the lower threshold value is decreased based on the monitored system key performance indicator falling below the lower threshold value and rising above the upper threshold value within a first predetermined time.

15. The method according to claim 14, wherein the lower threshold value is decreased based on the monitored external key performance indicator remaining within the predefined band within a second predetermined time.

16. A non-transitory computer readable medium storing a computer program for triggering a scaling action for scaling of an application having a set of one or more virtual machines, the computer program comprising software code portions that, upon execution by a processor of a digital computer, causes the digital computer to:

monitor a system key performance indicator and an external key performance indicator during application runtime;

adapt a lower threshold value and an upper threshold value based on an evaluation of the monitored system key performance indicator and the monitored external key performance indicator;

trigger the scaling action for scaling the application having the set of one or more virtual machines based on the monitored system key performance indicator crossing one of the lower threshold value and the upper threshold value;

validate, in response to an opposite scaling action being triggered based on the monitored system key performance indicator crossing an opposite threshold value of the one of the lower threshold value and the upper threshold value, the scaling action based on the monitored external key performance indicator remaining within a predefined band; and dynamically adjust, in response to the validation, the one of the lower threshold value and the upper threshold value by a predefined value during the application runtime.

\* \* \* \* \*